(12) United States Patent
Na et al.

(10) Patent No.: US 7,229,035 B2
(45) Date of Patent: Jun. 12, 2007

(54) METHOD OF DEAGGLOMERATING CERAMIC POWDER, DEAGGLOMERATION MILL USED THEREFOR AND METHOD OF PREPARING HIGHLY DISPERSED SLURRY USING THE DEAGGLOMERATED POWDER

(75) Inventors: Eun Sang Na, Kyungki-do (KR); Hyeon Pyo Jeon, Kyungki-do (KR); Dong Hwan Seo, Kyungki-do (KR); Youn Kyu Choi, Chollabook-do (KR); Sung Hyung Kang, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 33 days.

(21) Appl. No.: 11/023,610

(22) Filed: Dec. 29, 2004

(65) Prior Publication Data

US 2005/0143253 A1  Jun. 30, 2005

(30) Foreign Application Priority Data

Dec. 29, 2003 (KR) .................. 10-2003-0098678
Dec. 14, 2004 (KR) .................. 10-2004-0105714

(51) Int. Cl.
*B02C 19/00* (2006.01)
(52) U.S. Cl. .................. 241/21; 241/30; 241/171; 241/172
(58) Field of Classification Search .................. 241/30, 241/171, 172, 21, 16, 22
See application file for complete search history.

(56) References Cited

U.S. PATENT DOCUMENTS 4,967,968 A * 11/1990 Vitelli .................. 241/46.17
5,678,776 A * 10/1997 Zoz .................. 241/171

FOREIGN PATENT DOCUMENTS

JP  09-253517  9/1997
KR  1990-0007478  6/1990
KR  2001-0101660  11/2001

* cited by examiner

*Primary Examiner*—Mark Rosenbaum
(74) *Attorney, Agent, or Firm*—Lowe Hauptman & Berner, LLP.

(57) ABSTRACT

Disclosed herein is a method of deagglomerating ceramic powder to inhibit agglomeration and provide a uniform particle size, a deagglomeration mill used for the above method, and a method of preparing uniformly mixed ceramic slurry using the deagglomerated ceramic powder. The deagglomeration method of the ceramic powder includes loading a mixture of ceramic powder and solvent into the deagglomeration mill which includes a hollow cylindrical mill cover having a diameter larger than a length and having a plurality of beads therein; rotating an impeller of a main shaft disposed longitudinally at an internal center portion of the mill cover at a peripheral velocity of 6–10 m/s, using a driving means; deagglomerating the ceramic powder by the action of beads which are moved by a rotational force of the impeller; and discharging the mixture of ceramic powder and solvent from the deagglomeration mill.

20 Claims, 6 Drawing Sheets

METHOD OF DEAGGLOMERATING CERAMIC POWDER, DEAGGLOMERATION MILL USED THEREFOR AND METHOD OF PREPARING HIGHLY DISPERSED SLURRY USING THE DEAGGLOMERATED POWDER

RELATED APPLICATIONS

The present application is based on and claims priority from, Korean Application Number 2003-98678, filed Dec. 29, 2003 and Korean Application Number 2004-105714, filed Dec. 14, 2004, the disclosures of which are hereby incorporated by reference herein in its entirety.

BACKGROUND OF THE INVENTION

1. Field of the Invention

The present invention relates generally to a method of deagglomerating ceramic powder to have a uniform particle size; a deagglomeration mill used for the above method; and a method of preparing highly dispersed ceramic slurry using the deagglomerated ceramic powder.

More specifically, the present invention relates to a method of deagglomerating ceramic powder so as to inhibit agglomeration and achieve a uniform particle size; a deagglomeration mill for use in the above method; and a method of preparing highly dispersed ceramic slurry using the deagglomerated ceramic powder.

2. Description of the Related Art

Fabrication techniques of multilayer ceramic capacitors (hereinafter, abbreviated as 'MLCC') have recently trended toward miniaturization and ultrahigh capacitance, which can be realized by thinning an inner electrode and a dielectric layer and stacking more layers.

In particular, with the aim of manufacturing a multilayer structure having ultrahigh capacitance, a dielectric material, such as $BaTiO_3$, $MgO$, $MnO_2$, $V_2O_5$, $Cr_2O_3$, $Y_2O_3$, rare earth elements, and glass frit, constituting the dielectric layer, should be made fine. Also, slurry preparation to disperse fine particles is required to minimize the effects of high electric fields due to the formation of a thin dielectric layer of 3 μm or less so as to ensure electric reliability.

However, the formation of the fine particles causes high surface area, thus increasing the driving force of a sintering process. Eventually, rapid particle growth occurs.

In the fabrication of MLCCs having ultrahigh capacitance, $BaTiO_3$, which comprises most of the starting materials, is used having the particle sizes of 0.2, 0.15 and 0.1 μm.

These particles agglomerate mostly during a particle synthesis process such as a hydrothermal process, an oxalate process, hydrolysis or solid-state synthesis, and during a heat treatment process to ensure consistent particle size and crystallinity and remove impurities.

Meanwhile, a chip is generally fabricated by mixing the $BaTiO_3$ powder with a ceramic additive, an organic solvent, a plasticizer, a binder, and a dispersing agent to prepare a slurry using a basket mill, followed by forming, laminating and compressing the slurry.

A conventional slurry preparation process is illustrated in FIG. 1. That is, $BaTiO_3$, the ceramic additive, the solvent and the dispersing agent are weighed and mixed, followed by primary milling for 12–24 hours, to obtain a pulverized product. Thereafter, the pulverized product is mixed with the binder, the plasticizer and the solvent, followed by secondary milling for about 12 hours and then filtering. At this time, however, reagglomeration and viscosity become high, and thus, it is difficult to perform the filtration process. After the filtration process, the mixed state of the slurry is analyzed using PSA (Particle Size Analysis), SEM (Scanning Electronic Microscopy) and EPMA (Electron Probe Micro Analysis).

As for conventional slurry dispersion, in cases where fine powder is dispersed using a basket mill or bead mill, soft and hard agglomerations of $BaTiO_3$ are difficult to remove. The two mill media are zirconia and yttria zirconia, with a size of 0.6–1 mm.

The fine ceramic powder should be deagglomerated for high dispersion and grain growth control, before being used for the preparation of ceramic slurry. This is because an additive is not uniformly dispersed into neck-formed powders, and also, particles agglomerated during the heat treatment function as one crystal particle, and thus, it is impossible to form a dielectric thin film layer. As well, the reliability decreases. Therefore, the ceramic powder, for example, $BaTiO_3$ powder, should be deagglomerated.

Specifically, in cases where $BaTiO_3$ is finely particulate, agglomeration of the particles results in a wide particle size distribution. For example, 0.2 μm $BaTiO_3$ has a particle size distribution of a D50 of 0.48 μm and a D90 of 1.0 μm. However, after such particles are subjected to deagglomeration treatment, the particle size thereof can be lowered to a D50 of 0.25 μm and a D90 of 0.45 μm, with narrow dispersion. That is, a uniform particle size can be ensured. By such a deagglomeration process, deagglomeration of the ceramic powder and attainment of a uniform particle size of the powder are realized.

Turning now to FIG. 2, a conventional bead mill 100 used for deagglomeration of ceramic powder is illustrated. The conventional bead mill 100 includes a hollow cylindrical mill cover 101 having an inlet 102 to load a mixture of ceramic powder and solvent into the mill cover 101, an outlet 104 to discharge the deagglomerated mixture therefrom, and a plurality of beads 114 therein. Further, a main shaft 110 is longitudinally disposed in the mill cover 101 to act as a central rotation shaft. Also, a driving means 120 for rotating the main shaft 110 is operatably connected thereto.

The driving means 120 is commonly exemplified by an electric motor, and is connected to the main shaft 110 through a power transfer belt 122 and pulleys 124a and 124b. Moreover, a plurality of circular discs 126 is mounted on the main shaft 110 to be rotated therewith. Each disc 126 has a plurality of through holes 126a so that the beads 114 can act to apply an action force to the ceramic powder upon rotation of the disc 126.

In the conventional bead mill 100 or basket mill as shown in FIG. 2, the mill cover 101 has a diameter (H) of 185 mm and a length (L) of 463 mm, and thus, a ratio of diameter to length of the hollow cylindrical mill cover 101 is 0.5 or less. That is, the bead mill 100 is relatively long relative to its diameter. In addition, the beads 114 have diameters of 0.65 mm or more. In the cases of using the conventional bead mill 100, the $BaTiO_3$ powder is deagglomerated while having a long retention time in the bead mill 100. Hence, a high impact force and a high shear force are applied to the ceramic powder, and the ceramic powder particles are primarily pulverized, resulting in the generation of larger amounts of fine particles having sizes of 0.001–0.01 μm.

Since the fine particles have a particle size distribution with wide dispersion, the ceramic slurry having the above particles causes particle growth in the dielectric material after sintering, and thus, abnormal particle growth occurs.

Upon using the ceramic powder obtained by the conventional bead mill 100, it is difficult to separate the agglomerated particles from each other, and as well, the powder has a wide particle size distribution due to the pulverized primary particles. In particular, the pulverized fine powder having a wide size distribution acts as a driving force for abnormal particle growth during the heat treatment, and hence, negatively affects the electric reliability and dielectric properties.

In the MLCC having ultrahigh capacitance, the slurry is prepared by increasing the amount of an organic solvent, such as toluene, ethanol or butanol, to reduce the viscosity of the slurry, and is then filtered using a filter having a size of 1–2 μm to obtain a final slurry.

However, the slurry preparation method as mentioned above is disadvantageous because the solid content of the powder decreases while the content of the polymer increases, thereby generating larger amounts of residue and causing high constriction when burning out the binder. Also, the size of the filter is limited by the unmelted binder, and the lifetime of the filter is shortened.

SUMMARY OF THE INVENTION

Accordingly, the present invention has been made keeping in mind the above problems occurring in the related art, and an object of the present invention is to provide a method of deagglomerating ceramic powder, so as to be suitable for use in manufacturing a multilayer ceramic capacitor having ultrahigh capacitance, and to have a uniform particle size and control the agglomeration.

Another object of the present invention is to provide a deagglomeration mill to deagglomerate the ceramic powder to give it a uniform particle size without pulverizing the powder.

Still another object of the present invention is to provide a method of preparing high dispersion ceramic slurry suitable for use in manufacturing a multilayer ceramic capacitor having ultrahigh capacitance.

In order to accomplish the above objects, according to a first aspect of the present invention, a method of deagglomerating ceramic powder using a deagglomeration mill is provided, the method comprising loading a mixture of ceramic powder and solvent into the deagglomeration mill which includes a hollow cylindrical mill cover having a diameter larger than its length and having a plurality of beads therein; rotating an impeller of a main shaft disposed longitudinally at an internal center portion of the mill cover at a peripheral velocity of 6–10 m/s, using a driving means; deagglomerating the ceramic powder by the action of the beads which are moved by the rotational force of the impeller; and discharging the mixture of deagglomerated ceramic powder and solvent from the deagglomeration mill.

According to a second aspect of the present invention, a deagglomeration mill for use in deagglomerating the ceramic powder is provided, comprising a hollow cylindrical mill cover having a diameter larger than its length, and including an inlet and an outlet to introduce and discharge a mixture of ceramic powder and solvent thereto and therefrom, respectively, and a plurality of beads therein; a main shaft disposed longitudinally at an internal center portion of the mill cover to act as a rotation shaft; a driving means operatably connected to an end of the main shaft projected from the mill cover for rotating the main shaft; and an impeller rotatably mounted on the main shaft to cause the beads to move so as to apply an action force to the mixture of ceramic powder and solvent, wherein the ceramic powder is deagglomerated by the action of the beads due to the rotation of the impeller at a peripheral velocity of 6–10 m/s.

According to a third aspect of the present invention, a method of preparing a ceramic slurry using ceramic powder is provided, the method comprising loading a mixture of ceramic powder and solvent into the deagglomeration mill which includes a hollow cylindrical mill cover having a diameter larger than its length and having a plurality of beads therein; rotating an impeller on a main shaft disposed longitudinally at an internal center portion of the mill cover to act as a central rotation shaft at a peripheral velocity of 6–10 m/s; deagglomerating the ceramic powder by the action of the beads; mixing the deagglomerated ceramic powder with a ceramic additive, a binder, a plasticizer, a solvent and a dispersing agent, to prepare a ceramic slurry, which is then subjected to primary media dispersion; high-pressure dispersion the media dispersed ceramic slurry under 10,000–25,000 psi; and filtering the high-pressure dispersed ceramic slurry.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

In the present invention, ceramic powder is deagglomerated so as to be suitable for use in fabrication of ultrahigh capacity MLCC while inhibiting abnormal growth of crystal particles due to non-uniform particle size and formation of fine particles when milling the ceramic powder. Further, highly dispersed ceramic slurry is prepared by a high-pressure dispersion process of the deagglomerated ceramic powder.

The deagglomerated ceramic powder according to the method of the present invention and the ceramic slurry including the same are characterized in that the size distribution of the ceramic powder is uniform and agglomeration is controlled, thus inhibiting abnormal particle growth. When the ceramic slurry including the ceramic powder, which is in the state of being highly dispersed, is applied to MLCC, the abnormal particle growth of the crystal particles after a sintering process is inhibited, therefore resulting in articles having high reliability.

The deagglomerated ceramic powder and the highly dispersed ceramic slurry of the present invention are applicable for manufacturing MLCCs having ultrahigh capacitance and an active layer that is 3 μm or thinner.

In the deagglomeration method and the preparation method of the uniformly mixed ceramic slurry of the present invention, any fine ceramic powder used in manufacturing electronic devices may be applied. The ceramic powder is exemplified by dielectric ceramic powder such as barium titanate based ceramic powder, strontium titanate based ceramic powder or lead titanate based ceramic powder, magnetic ceramic powder such as ferrite ceramic powder, piezoelectric ceramic powder, and insulating ceramic powder such as alumina and silica. Particularly, the ceramic powder is exemplified by $BaTiO_3$ powder. Herein, the present invention is described using $BaTiO_3$ powder (hereinafter, abbreviated as 'BT powder' When using the deagglomeration mill of the present invention, an impact force applied to the ceramic powder during deagglomeration is minimized and a shear force applied thereto is maximized. Thereby, the ceramic particles are separated from each other without damage to primary particles, and thus, the ceramic powder is deagglomerated but not pulverized. Through the deagglomeration process as mentioned above, agglomeration of the ceramic powder is controlled, and uniform particle size is obtained.

Figure 1:
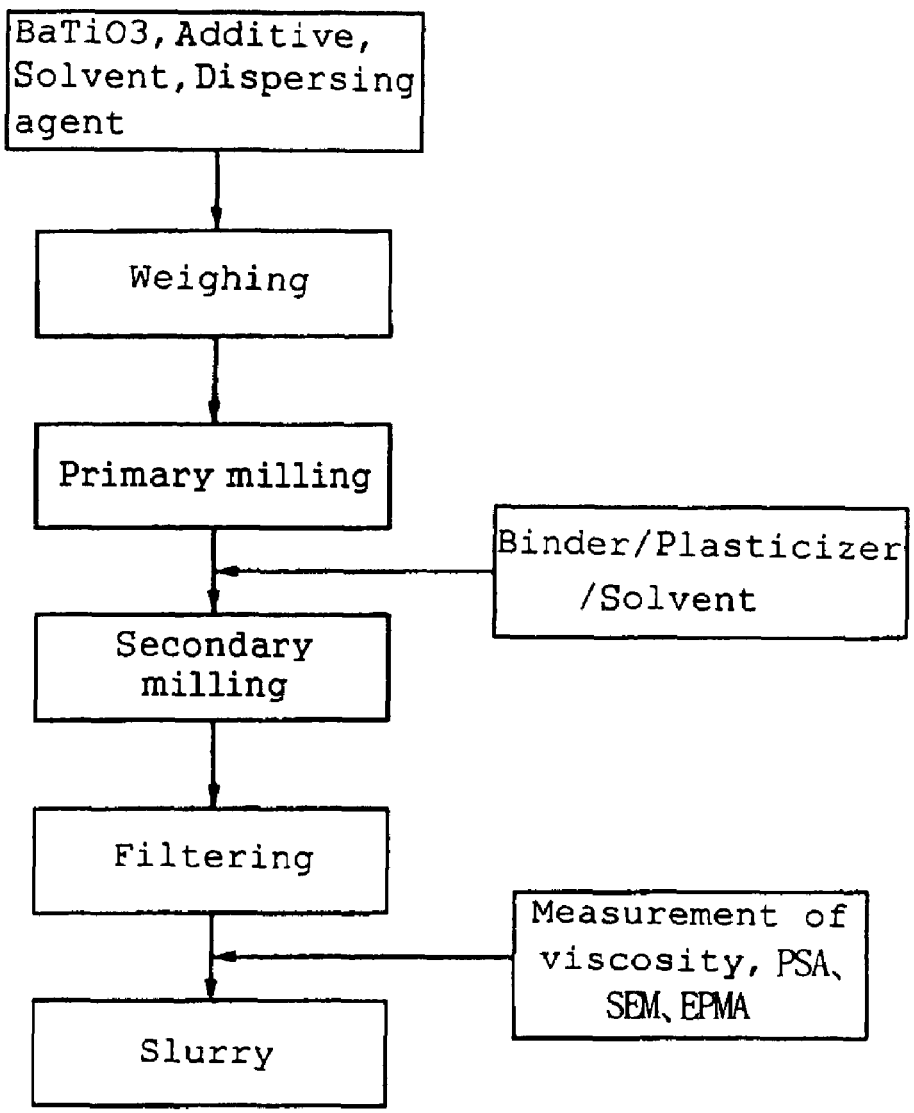
FIG. 1 is a flow chart schematically showing a conventional slurry preparation process.
Figure 2:
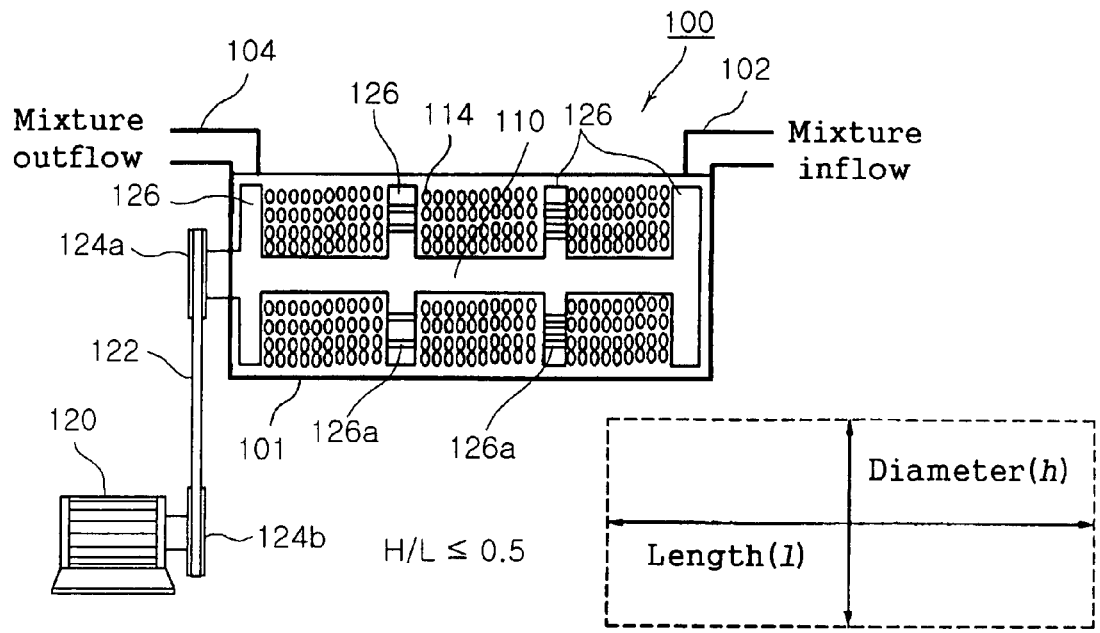
FIG. 2 is a view showing a conventional bead mill used for the deagglomeration of ceramic powder.
Figure 3:
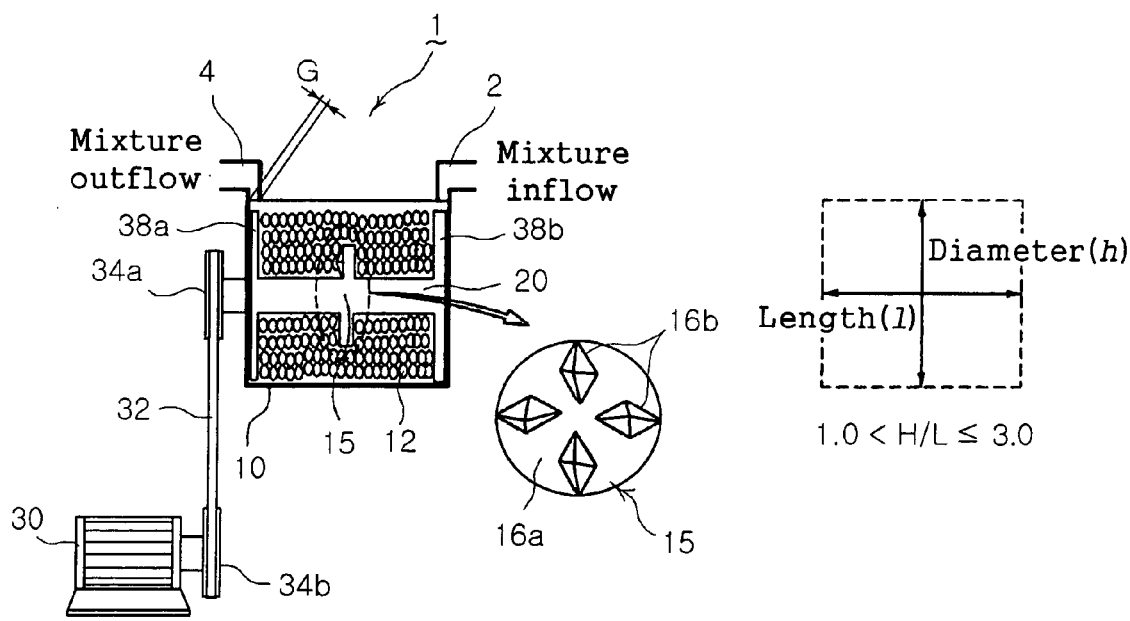
FIG. 3 is a view showing a deagglomeration mill used for the deagglomeration of ceramic powder according to the present invention.

FIG. 3 shows the deagglomeration mill according to the present invention. The deagglomeration mill 1 includes a hollow cylindrical mill cover 10 having an inlet 2 and an outlet 4 to introduce and discharge the mixture of ceramic powder and solvent thereto and therefrom, respectively, and a plurality of beads 12 therein. To minimize the impact force applied to the ceramic powder while maximizing the shear force during the deagglomeration, the mill cover 10 of the deagglomeration mill 1 of the present invention is manufactured to have a diameter/length (H/L) ratio in the range of 1.0<H/L ratio≦3.0. That is, the mill cover 10 of the deagglomeration mill 1 has a diameter (H) larger than a length (L). If the H/L ratio of the mill cover 10 of the deagglomeration mill 1 falls outside of the above range, for instance, if it is less than the above range, the length (L) of the mill cover 10 is larger than the diameter (H), and the ceramic powder is not deagglomerated but is pulverized due to the increased impact force from the beads 12. On the other hand, if the diameter/length (H/L) ratio is larger than 3.0, the diameter is excessively larger relative to the length, and hence, the deagglomeration mill 1 is unusable.

Further, as a retention time of the ceramic powder in the deagglomeration mill 1 lengthens, the impact force applied to the ceramic powder increases. Hence, the deagglomeration mill 1 of the present invention includes a relatively short deagglomeration mill corresponding to ⅓–⅔ length of a general deagglomeration mill. Preferably, the diameter (H) and the length (L) of the mill cover 10 are 175 mm and 150 mm, respectively. By using the deagglomeration mill 1 modified to have a short length, the retention time of the ceramic powder in the deagglomeration mill 1 for deagglomeration is reduced, so that the applied impact force decreases. Consequently, the ceramic powder is not pulverized but is efficiently deagglomerated. Further, the deagglomeration mill 1 comprises locking means on each of the inlet 2 and outlet 4 of the mill cover 10 so that it can be either selectively opened or closed.

Further, the deagglomeration mill 1 of the present invention has a main shaft 20 longitudinally disposed at an internal center portion of the mill cover 10 to act as a central rotation shaft, and a driving means 30 operatably connected to an end of the main shaft 20 projected from the mill cover 10 for rotating the main shaft 20.

The driving means 30 is, for example, an electric motor, and is connected to the main shaft 20 through a power transfer belt 32 and pulleys 34a and 34b. In addition, an impeller 15 is mounted on the main shaft 20 so that the beads 14 apply an action force to the mixture of ceramic powder and solvent. Although a single impeller 15 is mounted on the main shaft 20 in FIG. 3, the number of impellers 15 is not limited in the present invention, and preferably, is 2 to 4. That is, the number of impellers 15 is determined depending on the diameter and the rotational velocity of the impellers 15.

In addition, opposite ends of the main shaft 20 are integrated with a pair of discs 38a and 38b each having a diameter approximately equal to an inner diameter of the mill cover 10. Upon rotation of the main shaft 20 of the deagglomeration mill 1, the impeller 15 and the pair of discs 38a and 38b are rotated together. In this case, the discs 38a and 38b function to prevent the beads 12 in the mill cover 10 from coming into direct contact with the opposite side surfaces of the mill cover 10 and thus minimize wear.

Further, if the zirconia beads 12 filled in the deagglomeration mill 1 are smaller, the impact force applied to the ceramic powder decreases while the shear force applied thereto increases. In the present invention, zirconia beads 12 having a diameter of 0.2–0.3 mm are used. If the zirconia beads 12 are smaller than 0.2 mm, they are undesirably discharged from the deagglomeration mill 1, along with the ceramic powder. In contrast, if the zirconia beads 12 are larger than 0.3 mm, the impact force becomes high and thus the ceramic powder is undesirably pulverized.

Accordingly, in the present invention, the zirconia beads 12 having a diameter of 0.2–0.3 mm are used, and thus, a gap G provided to discharge only the ceramic powder from the outlet 4 of the deagglomeration mill 1 is designed to have a small size so that the beads 12 having the above diameter range are not discharged from the deagglomeration mill 1 but stay therein.

Use of the small beads 12 results in the application of low impact force and high shear force to the ceramic powder of the mixture. Thus, the ceramic powder is effectively deagglomerated while being minimally pulverized. In the deagglomeration mill 1 of the present invention, the beads 12, the discs 38a and 38b, the impeller 15 and the main shaft 20 are made of zirconia or yttria-stabilized zirconia.

In the deagglomeration mill 1 of the present invention, the impeller 15 is provided at a middle portion of the main shaft 20 so that the mixture of ceramic powder and solvent is rotated among the beads 12 at a low peripheral velocity. The impeller 15 has a structure functioning to effectively distribute the applied pressure. As shown in FIG. 3, it is preferable that the impeller 15, having a plurality of quadrangular pyramid-shaped projections 16b in a diamond shape peripherally disposed at equal intervals on a side surface of a disc-shaped body 16a thereof, be perpendicularly mounted on the main shaft 20.

The projection 16b is formed into a structure able to provide valance (stability) and disperse force upon rotation of the impeller 15. As such, four projections 16b are preferably disposed at equal intervals. Moreover, the projection 16b may be integrated with the disc-shaped impeller body 16a or separately formed and attached thereto. To be easily replaced by a new projection after wear of the projection 16b, it is preferable that the projection 16b be separately formed and then attached to the disc-shaped impeller body 16a, for example, by a screw. Since the projection 16b of the impeller 15 is formed in the shape of a tetrahedron similar to a diamond, it generates a driving force and a rotational force required to push the beads 12 forwards upon rotation. Thereby, the ceramic powder in the mixture of ceramic powder and solvent is easily deagglomerated but not pulverized.

The impeller 15 forcibly rotates the beads 12 and the ceramic powder, unlike a conventional disc, and hence, it is possible to perform the deagglomeration process at a relatively low peripheral velocity.

Thus, according to the deagglomeration method of the present invention, the impeller 15 rotates at a lower peripheral velocity to minimize the impact force applied to the ceramic powder, therefore deagglomerating the ceramic powder. That is, the ceramic powder is deagglomerated at a peripheral velocity of 6–10 m/s by the impeller 15. If the peripheral velocity (circumferential linear velocity) is less than 6 m/s, a material to be deagglomerated, that is, a mixture of ceramic powder and solvent, is not efficiently rotated in the deagglomeration mill 1. Meanwhile, if the velocity exceeds 10 m/s, the impact force becomes high to the extent of pulverizing the ceramic powder. The peripheral velocity of the impeller 15 is obtained by the following equation:

$$\text{Peripheral Velocity} = (\pi \cdot D \cdot \text{rotational frequency (rpm)})/(60 \cdot 100)$$

Wherein D is a diameter of the impeller, in which D is preferably 100 mm. Therefore, the impeller 15 has the rotational frequency 1146 rpm at a peripheral velocity of 6 m/s, 1338 rpm at 7 m/s, 1529 rpm at 8 m/s, 1720 rpm at 9 m/s, and 1910 rpm at 10 m/s. Therefore, the impeller 15 has 1146–1910 rpm at 6–10 m/s.

In the ceramic powder deagglomeration method of the present invention, the ceramic powder is mixed with a solvent, such as water or alcohol, and then loaded into the deagglomeration mill 1. As such, the deagglomeration process can be optimally performed by appropriately changing the peripheral velocity of the impeller 15 of the deagglomeration mill 1 and the number of passages through the deagglomeration mill 1, depending on the powder size, particle distribution, kinds of powder, and amount of solid content in the ceramic powder and solvent mixture.

That is, while the size change of the particles is observed, depending on the peripheral velocity of the impeller 15 and the number of passages, optimal conditions separating the particles from each other, but not pulverizing them, are selected. The degree of deagglomeration of the ceramic powder is confirmed by PSA and SEM analysis. The deagglomerated ceramic powder is mixed with a ceramic additive, a binder, a plasticizer, a solvent and a dispersing agent, followed by primary media dispersion by milling and then high-pressure dispersion, to prepare the highly dispersed ceramic slurry.

Figure 4:
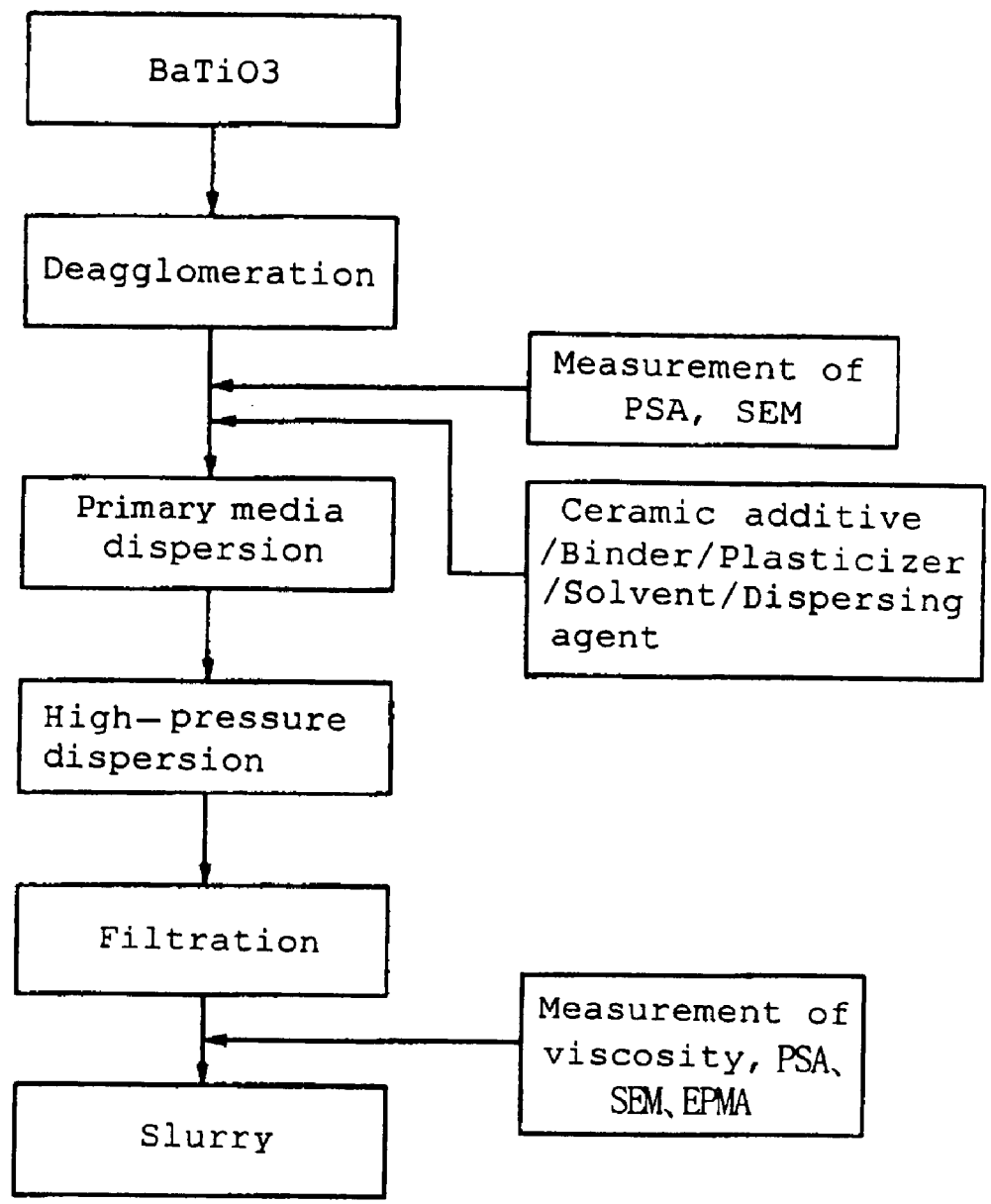
FIG. 4 is a flow chart schematically showing a slurry preparation process according to the present invention.

FIG. 4 shows a method of preparing highly dispersed ceramic slurry, according to the present invention.

In the slurry preparation method of the present invention, the deagglomerated ceramic powder is mixed with a component to be commonly mixed upon slurry preparation, for example, a ceramic additive, a binder, a plasticizer, a solvent and a dispersing agent, followed by primary media dispersing. Thereby, the ceramic powder is uniformly pre-mixed with the above components. The primary media dispersion is performed using a basket mill. The primary media dispersion is carried out for about 3–5 hours, preferably, about 3 hours, to obtain a primary slurry.

The primary media dispersion functions to mix the components for stabilization. However, since media mixing for a long time pulverizes the particles, the above process is performed only to the extent of achieving sufficient mixing.

If the milling time is less than 3 hours, it is impossible to achieve uniform mixing. Meanwhile, if the milling time exceeds 5 hours, the particles may be undesirably pulverized. The ceramic powder is added in an amount of 10–50 wt % based on the total amount of slurry. If the amount of the slurry powder is less than 10 wt %, productivity (mass production) becomes poor. On the other hand, if the amount exceeds 50 wt %, desired dispersion cannot be obtained.

Figure 5:
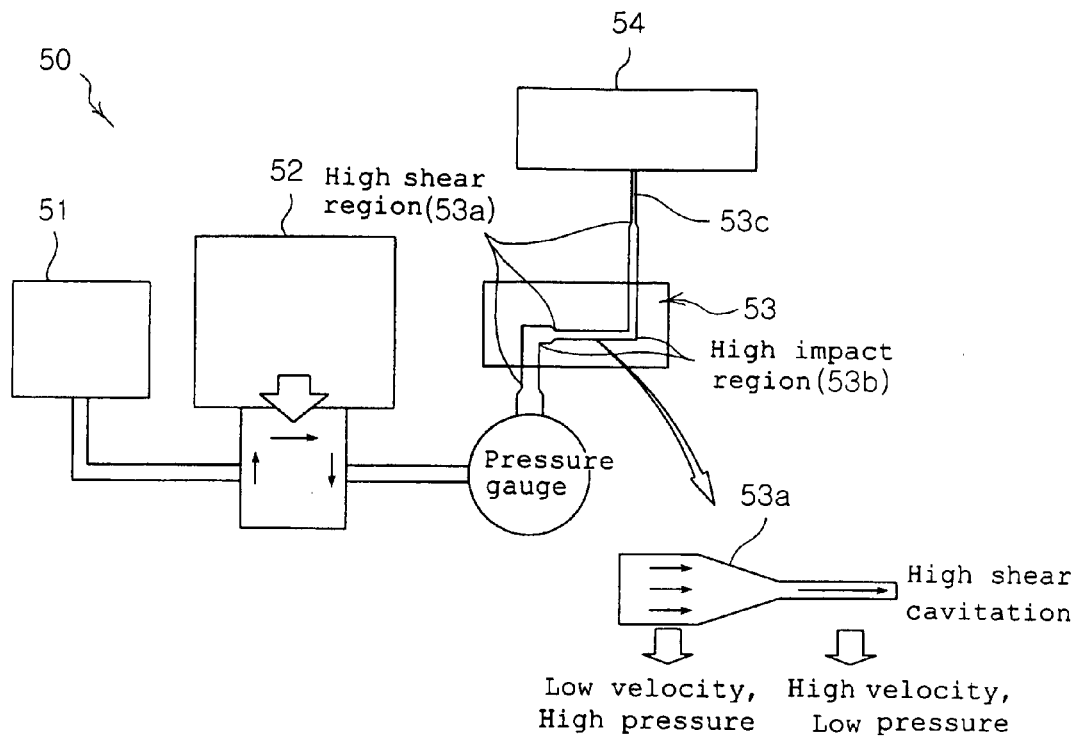
FIG. 5 is a view showing a high-pressure distributor used for preparation of high dispersed slurry according to the present invention.

The primary slurry is subjected to high-pressure dispersion using a high-pressure distributor 50 to prepare a final slurry. The high-pressure distributor 50 used for preparation of the slurry of the present invention is illustrated in FIG. 5. Dispersion in the high-pressure distributor 50 is performed under a high pressure of about 15,000–25,000 psi. By passing about 3–7 times through the high-pressure distributor 50, the slurry is highly dispersed. Then, a filtration process is conducted using a filter having a size of 1–2 μm, to obtain the final slurry.

As depicted in FIG. 5, the high-pressure distributor 50 includes an inlet 51, a compression chamber 52, a reaction chamber 53 and an outlet 54. The ceramic slurry mixture is fed into the inlet 51, after which the pressure increases using a pressure pump (not shown) in the compression chamber 52. Before feeding the ceramic slurry mixture into the inlet 51, the solid content, the viscosity, and the powder size of the mixture should be considered.

The pressure increases to a maximum of 25,000 psi in the compression chamber 52. If the pressure exceeds 25,000 psi, the device may become inoperative. In the present invention, in cases where powder having a size of about 0.3 μm or less should be dispersed, pressure of 15,000–25,000 psi is required. When the pressure is less than 15,000 psi, Shear force is not sufficient for dispersion, resulting in non-uniform dispersion. In contrast, when the pressure exceeds 25,000 psi, the high-pressure distributor 50 becomes inoperative.

The reaction chamber 53 serves to apply an impact force, a shear force and a cavitation force to the target material. When the slurry flows in the reaction chamber 53 under the conditions of low velocity and high pressure, it collides against the wall of the tube at second positions 53b which are bent after passing through first positions 53a having drastically reduced diameters, as in FIG. 5. As shown in the enlarged part of FIG. 5, when the slurry is moved from a tube portion of a larger diameter to a tube portion of a smaller diameter while passing through the first positions 53a, the slurry under the condition of low velocity and high pressure is changed to the slurry under the condition of high velocity and low pressure, thereby generating a high shear force. Further, upon discharging the material from the tube at a third position 53c, a cavitation force occurs due to a drastic pressure drop (generated upon passing from the tube of smaller diameter to the tube of larger diameter).

In the present invention, the reaction chamber 53 formed into a Z-shape is employed. As in FIG. 5, the tube of the reaction chamber 53, that is, the tube at the first position 53a of the reaction chamber 53 causing high velocity and low pressure has a diameter of 200 μm or less, and is made of very hard diamond. Also, the number of passages of the slurry through the reaction chamber 53 is controlled, if necessary.

The high-pressure distributor 50 is designed to generate high impact, high shear and high cavitation force consecutively using high pressure and a tube having a small diameter. Therefore, high-pressure mixing leads to dispersion (scattering) of the ceramic powder, and uniform distribution (dispersion) of the ceramic powder and the ceramic additives, such as MgO, $Y_2O_3$, $MnO_2$, $SiO_2$, $Ho_2O_3$, $Dy_2O_3$, $Er_2O_3$ or glass frit. Thereby, pin holes due to agglomeration of polymers after formation of dielectric layer can be prevented.

The slurry is composed mainly of the deagglomerated ceramic powder, the additives and the organic material, in which the deagglomerated ceramic powder and the additive should be uniformly dispersed (distributed), and also, the deagglomerated ceramic powder, the additive and the organic material should be uniformly dispersed. By using the high-pressure distributor 50, the deagglomerated ceramic powder and the additive, and the deagglomerated ceramic powder, the additive and the organic material are uniformly dispersed.

The prepared ceramic slurry is formed into a dielectric layer (thin film). At this time, if the deagglomerated ceramic powder and the additives, or the deagglomerated ceramic powder, the additives and the organic material are not uniformly distributed in the slurry, agglomerated organic material (polymer) is present in the dielectric layer, therefore defects, such as pin holes, may occur in the dielectric layer. Hence, the high-pressure dispersion is efficiently applied so that the deagglomerated ceramic powder, the additive and the organic material are sufficiently dispersed.

By the dispersion using the high-pressure distributor 50, abnormal particle growth, causing low electric reliability after the sintering process, is prevented, and also, a uniform fine structure can result. Dispersibility of the ceramic particles, and of the ceramic particles and other slurry components is improved, thus ensuring dispersion stability in the slurry. Through the deagglomeration process, the primary media dispersion process and the high-pressure dispersion process, the slurry has a uniform particle size and is decreased in viscosity, and thus, clogging due to undispersed polymers is prevented. Further, the filtration process using a filter having size of 1–2 μm can be performed, thereby obtaining the final slurry. After the high-pressure dispersion and the filtration, viscosity, PSA, SEM and EPMA are measured to confirm the degree of dispersion.

A better understanding of the present invention may be obtained in light of the following examples which are set forth to illustrate, but are not to be construed to limit the present invention.

EXAMPLE 1

$BaTiO_3$ powder having a particle size of 0.3 μm or less and EtOH were weighed and then mixed according to mixing ratios shown in Table 1, below, while being stirred for 1 hour at 300 rpm using a stirrer.

For example, 10 wt % solid content is achieved by a mixture of 100 g of EtOH and 10 g of $BaTiO_3$ powder. After the main power of a deagglomeration mill 1 was turned on, cooling water and air were introduced. The mixture of $BaTiO_3$ powder and EtOH was fed from an outlet of the stirrer into an inlet 2 of the deagglomeration mill 1 using a diagram pump.

The $BaTiO_3$ powder mixed according to the solid content of Table 1 was tested three times while changing the peripheral velocity, the discharge rate, and the number of passages through the deagglomeration mill, as shown in Table 1, below. The D90 particle size is given in Table 1.

The deagglomeration mill 1 had a length of 150 mm and a diameter of 175 mm, and was fitted with an impeller 15 having a diameter of 100 mm and filled with zirconia beads 12 having a diameter of 0.3 mm, as depicted in FIG. 3. Before passing through the deagglomeration mill 1, the $BaTiO_3$ powder size of the slurry was measured prior to the deagglomeration. Then, the samples were obtained when passed through the deagglomeration mill 1. Upon passage, the fine structure (SEM analysis) and the particle size (PSA) of the $BaTiO_3$ powder were measured. The mixture of $BaTiO_3$ powder and EtOH was passed through the deagglomeration mill 1 as long as the primary particles of $BaTiO_3$ powder were not pulverized and until the necks of the particles were separated from each other.

TABLE 1

| Ex. No. | Solid content (wt %) | Peripheral Velocity (m/s) | Discharge Amount (ml/min) | Number of Passages | 1$^{st}$ D90 (μm) | 2$^{nd}$ D90 (μm) | 3$^{rd}$ D90 (μm) |
|---|---|---|---|---|---|---|---|
| 1 | 10 | 6 | 600 | 2 | 0.602 | 0.614 | 0.608 |
| 2 | 10 | 6 | 600 | 4 | 0.401 | 0.413 | 0.407 |
| 3 | 10 | 6 | 1000 | 2 | 0.815 | 0.801 | 0.808 |
| 4 | 10 | 6 | 1000 | 4 | 0.564 | 0.553 | 0.5585 |
| 5 | 10 | 10 | 600 | 2 | 0.445 | 0.456 | 0.4505 |
| 6 | 10 | 10 | 600 | 4 | 0.273 | 0.285 | 0.279 |
| 7 | 10 | 10 | 1000 | 2 | 0.654 | 0.635 | 0.64 |
| 8 | 10 | 10 | 1000 | 4 | 0.441 | 0.456 | 0.4485 |
| 9 | 30 | 6 | 600 | 2 | 0.7 | 0.689 | 0.6945 |
| 10 | 30 | 6 | 600 | 4 | 0.563 | 0.558 | 0.5605 |
| 11 | 30 | 6 | 1000 | 2 | 0.772 | 0.782 | 0.777 |
| 12 | 30 | 6 | 1000 | 4 | 0.543 | 0.538 | 0.5405 |
| 13 | 30 | 10 | 600 | 2 | 0.535 | 0.544 | 0.5395 |
| 14 | 30 | 10 | 600 | 4 | 0.432 | 0.442 | 0.437 |
| 15 | 30 | 10 | 1000 | 2 | 0.846 | 0.859 | 0.8525 |
| 16 | 30 | 10 | 1000 | 4 | 0.532 | 0.528 | 0.53 |

From the results of the above table, the following Equation 1 was obtained:

$$D90 = 0.680 + 0.00461 \text{ solid content} - 0.0253 \text{ peripheral velocity} + 0.000377 \text{ discharge rate} - 0.101 \text{ passages}$$

Equation 1

The optimal deagglomeration condition satisfying Equation 1 was 30 wt % solid content, 10 m/s peripheral velocity, 800 ml/min discharge rate and 3 passages.

Figure 6:
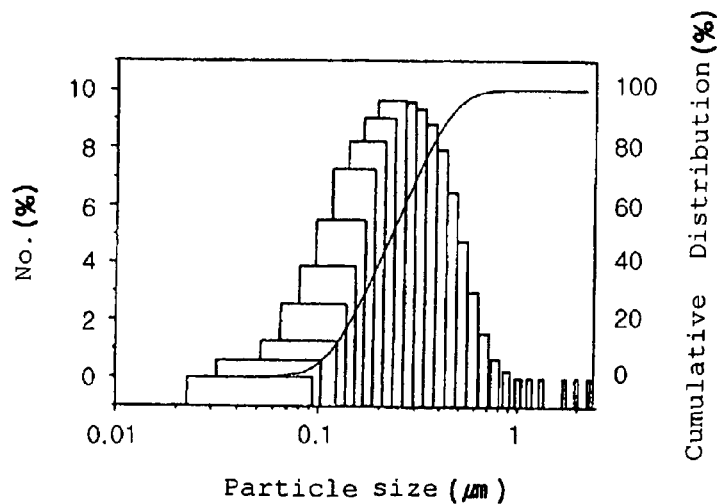
FIG. 6 is a graph showing a particle size distribution of $BaTiO_3$ deagglomerated in Example 1 of the present invention.
Figure 7:
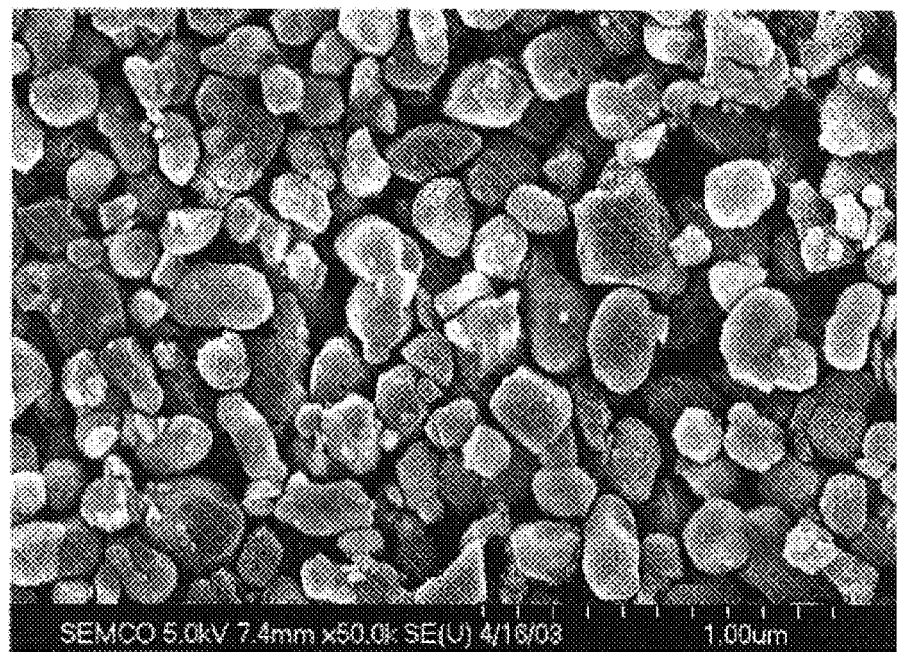
FIG. 7 is an SEM photograph of deagglomerated powder in Example 1 of the present invention.

Thus, the $BaTiO_3$ powder was deagglomerated according to the conditions resulting from the above equation. As such, the resultant particle size distribution had a D10 of 0.12 μm, a D50 of 0.233 μm, and a D90 of 0.447 μm. The results are shown in FIGS. 6 and 7. FIG. 6 is a graph showing the particle size distribution, and FIG. 7 is an SEM photograph (magnitude 30,000×).

When the mixture of $BaTiO_3$ powder and EtOH having 30 times through the deagglomeration mill 1 at a peripheral velocity of 10 m/s and a discharge rate of 800 ml/min, a D90 (90% portion in the particle size analysis) of 1.01 μm before the deagglomeration of $BaTiO_3$ powder was changed to a D90 of 0.447 μm after the deagglomeration.

EXAMPLE 2

The slurry including 100 mol % $BaTiO_3$ powder deagglomerated as in Example 1, 1.0 mol % MgO, 0.01 mol % $Mn_3O_4$, 1.0 mol % $Y_2O_3$, 5 mol % $SiO_2$, 145 wt % toluene/EtOH (1:1 weight ratio), 2.5 mol % dispersing agent (RE 610, Toho Chemical Co. (Japan)), 11.5 wt % binder (PVB), and 3.165 wt % plasticizer (DOP) was subjected to primary media dispersion by milling at 750 rpm/min for 3 hours using a basket ball mill.

Thereafter, the slurry was subjected to high-pressure dispersion using a high-pressure distributor 50 shown in FIG. 5. The pressure of the distributor 50 was 25,000 psi. The slurry was passed three times through the reaction chamber 53, and then filtered using a 2 μm filter, to obtain a slurry. The BT slurry of the present example had K=210.3 and V=0.9711, which show low absolute viscosity (K) and are similar to Newtonian flow. From this result, it can be confirmed that the slurry was highly dispersed in the stable state.

Figure 8:
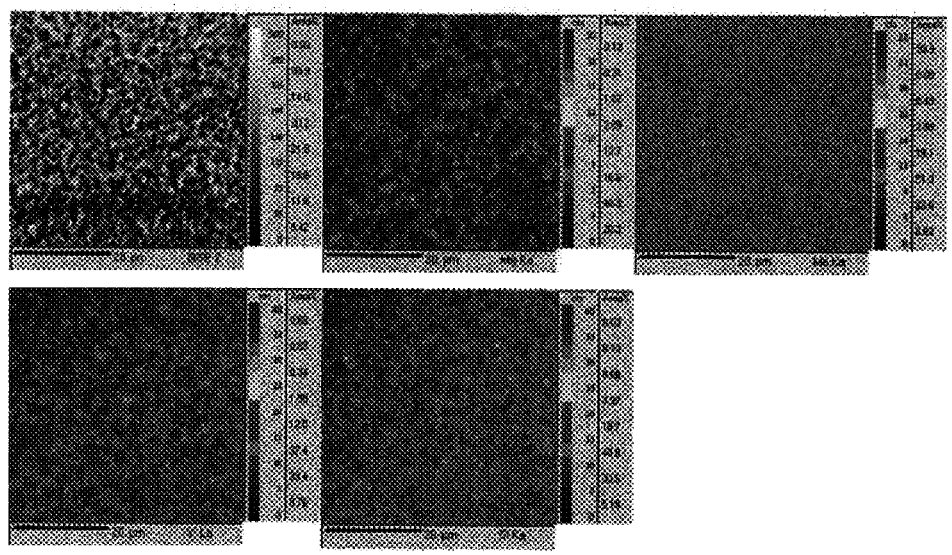
FIG. 8 is an EPMA photograph of a dielectric film manufactured using the slurry of Example 2 of the present invention.

After the dielectric film was formed using the mixed slurry, EPMA (Electron Probe Microstructure Analysis) was performed. The analytic photograph is shown in FIG. 8. In FIG. 8, it can be seen that uniform dispersion of Ba, Mg, Mn, Y and Si was realized, as shown by the speckled areas.

As described above, the present invention provides a method of deagglomerating ceramic powder, a deagglomeration mill used therefor, and a method of preparing uniformly mixed slurry using the deagglomerated ceramic powder. The ceramic powder is deagglomerated using the deagglomeration mill of the present invention, so that it has a uniform particle size distribution. Further, the slurry containing the deagglomerated ceramic powder is subjected to high-pressure dispersion, thus obtaining the highly dispersed ceramic slurry. When a 3 μm or thinner ceramic sheet is manufactured using the uniformly mixed ceramic slurry, a base sheet has a uniform particle size. As well, the agglomerated particles are removed, thus improving the packing nature and ensuring desired surface levelness. In addition, after a sintering process, regular intervals between electrodes are maintained, and hence, electric short is prevented and favorable sheet roughness can result.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of deagglomerating ceramic powder using a deagglomeration mill, comprising:
   loading a mixture of ceramic powder and solvent into the deagglomeration mill which includes a hollow cylindrical mill cover having a diameter larger than a length and having a plurality of beads therein;
   rotating an impeller of a main shaft disposed longitudinally at an internal center portion of the mill cover at a peripheral velocity of 6–10 m/s, using a driving means;
   deagglomerating the ceramic powder by action of the beads which are moved by a rotational force of the impeller; and
   discharging the mixture of deagglomerated ceramic powder and solvent from the deagglomeration mill.

2. The method as set forth in claim 1, wherein the mill cover has 1.0<diameter/length ratio≦3.0, and the beads comprise zirconia beads having a diameter of 0.2–0.3 mm.

3. The method as set forth in claim 1, wherein the deagglomerating the ceramic powder into a predetermined size is performed by changing the peripheral velocity of the impeller and the number of passages of the ceramic powder through the deagglomeration mill, depending on a powder size, a particle distribution, a kind of powder, and a solid content in the mixture of ceramic powder and solvent.

4. The method as set forth in claim 3, wherein the number of passages of the ceramic powder through the deagglomeration mill is determined so that particles of the ceramic powder are not pulverized and necks of the particles are separated from each other.

5. The method as set forth in claim 1, wherein the deagglomerated ceramic powder has a D90 represented by Equation 1:

$$D90=0.680+0.00461 \text{ solid content}-0.0253 \text{ peripheral velocity}+0.000377 \text{ discharge rate}-0.101 \text{ passages.} \qquad \text{Equation 1}$$

6. The method as set forth in claim 5, wherein a deagglomeration condition satisfying Equation 1 comprises 30 wt % solid content, 10 m/s peripheral velocity, 800 ml/min discharge rate and 3 passages.

7. A deagglomeration mill for use in deagglomeration of ceramic powder, comprising:
   a hollow cylindrical mill cover having a diameter larger than a length, and including an inlet and an outlet to introduce and discharge a mixture of ceramic powder and solvent thereto and therefrom, respectively, and a plurality of beads therein;
   a main shaft disposed longitudinally at an internal center portion of the mill cover to act as a rotation shaft;
   a driving means operatably connected to an end of the main shaft projected from the mill cover for rotating the main shaft;
   an impeller rotatably mounted on the main shaft to cause the beads to move so as to apply an action force to the mixture of ceramic powder and solvent; and
   a pair of discs integrated with opposite ends of the main shaft, each having a diameter equal to an inner diameter of the mill cover to prevent the beads in the mill cover from wearing by direct contact with opposite side surface of the mill cover, upon rotation of the main shaft,
   wherein the ceramic powder is deagglomerated by the action of the beads due to the rotation of the impeller at a peripheral velocity of 6–10 m/s.

8. The deagglomeration mill as set forth in claim 7, wherein the mill cover has 1.0<diameter/length ratio≦3.0, and the beads comprise zirconia beads having a diameter of 0.2–0.3 mm.

9. The deagglomeration mill as set forth in claim 7, wherein the impeller has a plurality of projections peripherally disposed at equal intervals on a side surface of a disc-shaped body thereof.

10. The deagglomeration mill as set forth in claim 9, wherein the projections of the impeller have a quadrangular pyramid-shape.

11. The deagglomeration mill as set forth in claim 9, wherein the projections of the impeller are detachably provided to the disc-shaped body thereof by a screw attachment.

12. The deagglomeration mill as set forth in claim 7, wherein the number of the impellers mounted on the main shaft is 1 to 4.

13. The deagglomeration mill as set forth in claim 7, wherein the beads, the discs, the impeller, and the main shaft are formed of zirconia or yittria-stabilized zirconia.

14. A method of preparing a ceramic slurry using ceramic powder, comprising:
   loading a mixture of ceramic powder and solvent into the deagglomeration mill which includes a hollow cylindrical mill cover having a diameter larger than a length and having a plurality of beads therein;

rotating an impeller on a main shaft disposed longitudinally at an internal center portion of the mill cover to act as a rotation shaft at a peripheral velocity of 6–10 m/s;

deagglomerating the ceramic powder by action of the beads;

mixing the deagglomerated ceramic powder with a ceramic additive, a binder, a plasticizer, a solvent and a dispersing agent, to prepare a ceramic slurry, which is then subjected to primary media dispersion;

high-pressure dispersion the media dispersion ceramic slurry under 10,000–25,000 psi; and filtering the high-pressure mixed ceramic slurry.

15. The method as set forth in claim 14, wherein the mill cover has 1.0<diameter/length ratio≦3.0, and the beads comprise zirconia beads having a diameter of 0.2–0.3 mm.

16. The method as set forth in claim 14, wherein the primary media dispersion is performed using a basket mill for a predetermined time period to achieve uniform pre-mixing of the ceramic powder and the added components without pulverizing particles of the ceramic powder.

17. The method as set forth in claim 14, wherein the ceramic powder is used in an amount of 10–50 wt %, based on a total amount of the slurry.

18. The method as set forth in claim 14, wherein the high-pressure mixing is performed using a high-pressure distributor comprising a reaction chamber having a tube, in which the tube includes a first position, at which a diameter of the tube is drastically decreased to have a tube portion having a larger diameter and a tube portion having a smaller diameter, and thus to cause conditions of low velocity and high pressure of the slurry to be changed to conditions of high velocity and low pressure of the slurry during passage of the slurry through the first position, thereby generating a shear force, a second position which is bent to cause the slurry to collide against a wall of the tube, and a third position to generate a depressing force due to a drastic pressure drop upon discharging the slurry from the tube.

19. The method as set forth in claim 18, wherein the slurry is passed through the high-pressure distributor in a plurality of times to be uniformly mixed.

20. The method as set forth in claim 14, wherein the filtering the slurry is performed using a filter having size of 1–2 μm to obtain a final slurry.

* * * * *